United States Patent [19]

Newbold et al.

[11] Patent Number: 5,341,971
[45] Date of Patent: Aug. 30, 1994

[54] COMPOSITE BICYCLE RACK

[75] Inventors: Dixon Newbold, Glocester, R.I.; Ian Gilley, West Boyleston, Mass.

[73] Assignee: Bell Sports, Inc., Providence, R.I.

[21] Appl. No.: 95,037

[22] Filed: Jul. 20, 1993

Related U.S. Application Data

[63] Continuation of Ser. No. 713,741, Jun. 11, 1991, abandoned.

[51] Int. Cl.⁵ .................................................. B62J 7/00
[52] U.S. Cl. .................................... 224/39; 224/32 A
[58] Field of Search ................. 224/39, 32 A, 30 R, 224/32 R; 280/304.5

[56] References Cited

U.S. PATENT DOCUMENTS

| | | | |
|---|---|---|---|
| 4,174,796 | 11/1979 | Nakamura | 224/39 |
| 4,266,702 | 5/1981 | Jackson et al. | 224/39 |
| 4,350,361 | 9/1982 | Fuji | 224/32 A |

FOREIGN PATENT DOCUMENTS 743649  1/1956  United Kingdom ................. 224/39

OTHER PUBLICATIONS

Rhode Rack that was on-sale more than one year prior to the filing of the parent application.

Primary Examiner—Linda J. Sholl
Attorney, Agent, or Firm—Wolf, Greenfield & Sacks

[57] ABSTRACT

The present invention provides a bicycle rack having a use position wherein it is attached to a bicycle and supported substantially above a wheel of the bicycle. Additionally, the rack can be disassembled and stored or packaged in a substantially planar position. The rack includes two main structural components. First, a rack shelf is provided having a platform and a leg channel extending downward therefrom. Second, a substantially U-shaped support member is detachably locked to the rack shelf and includes two support legs connected by a center beam. The center beam engages a bottom surface of the platform and the support legs engage the leg channel.

58 Claims, 6 Drawing Sheets

COMPOSITE BICYCLE RACK

This application is a continuation of application Ser. No. 07/713,741, filed Jun. 11, 1991 now abandoned.

BACKGROUND OF THE INVENTION

1. Field of the Invention

This invention relates to a general purpose bicycle rack for mounting upon a bicycle and for carrying various articles, accessories or persons.

2. Background Discussion

A number of bicycle racks are known which are mountable on bicycles and can be utilized to carry various articles, accessories or persons; most frequently these racks are mounted above the rear wheel. These prior art racks generally have two main structural components: (1) a flat shelf upon which articles can be attached and (2) support legs extending downward from the shelf and attaching to the axle of the bicycle. The prior art racks are generally constructed in one of the following two ways. First, some are constructed from a plurality of metal members that are welded together. An example of this type of rack is shown in U.S. Pat. No. 4,666,071. A disadvantage associated with this type of rack is that it cannot be disassembled by the consumer/user. Consequently, these racks consume an undesirably large amount of space when they are placed in storage, or need to be transported from one location to another. Second, another general type of rack utilizes separate shelf and support leg pieces which can either be locked together in an engagement position, or can be completely disengaged from each other. These racks have the potential to provide some advantages over the welded racks for storage or transportation purposes because they can be disassembled. However, many of these racks utilize support legs which have multiple struts that are welded together. Consequently, these welded support legs also consume a considerable amount of room and, therefore, cannot be easily stored or transported. Furthermore, these racks have an additional problem in that they are difficult to assemble and disassemble because they generally require a large number of hardware connecting pieces that are utilized to connect the rack shelf to the support legs at a plurality of interconnection points.

Accordingly, it is an object of the present invention to provide a bicycle rack that improves on the disadvantages associated with the prior art bicycle racks. More specifically, it is an object of the present invention to provide a bicycle rack that can easily be assembled and disassembled by a consumer. It is a further object of the present invention to provide a bicycle rack that does not consume a significant amount of storage space when it is not in use. Additionally, it is a further object of the present invention to provide a bicycle rack having the above-described advantages that can also be simply and inexpensively manufactured. Finally, it is an additional object of the present invention to provide a bicycle rack having the above-described advantages that can also be utilized with various rack accessories.

SUMMARY OF THE INVENTION

The present invention provides a bicycle rack having a use position wherein it is attached to a bicycle and supported substantially above a wheel of the bicycle. Additionally, the rack can be disassembled and stored or packaged in a substantially planar position. The rack includes two main structural components. First, a rack shelf is provided having a platform and a leg channel extending downward therefrom. Second, a substantially U-shaped support member is detachably locked to the rack shelf and includes two support legs connected by a center beam. The center beam engages a bottom surface of the platform and the support legs engage the leg channel.

DETAILED DESCRIPTION

Figure 1:
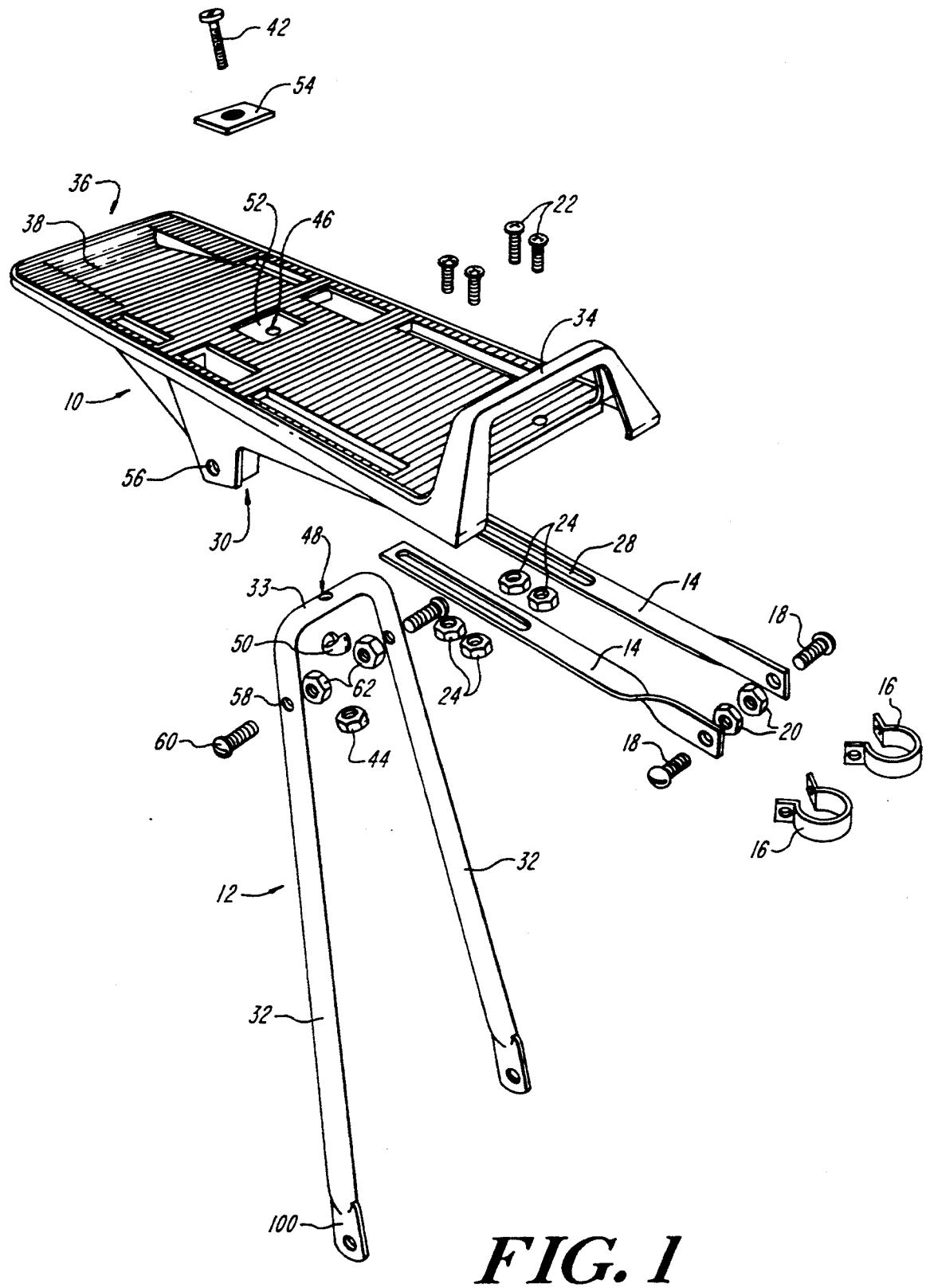
FIG. 1 is an exploded perspective view of a preferred bicycle rack according to the invention.

FIG. 1 is a perspective view of the composite rack of a preferred embodiment of the invention, as well as hardware that may be used to connect it to a bicycle. The composite rack is made up of two main structural pieces, the rack shelf 10 for supporting articles and the support member 12 for supporting the rack shelf 10 above the wheel of a bicycle.

The rack shelf 10 can be constructed from any one of a number of suitable materials known to those skilled in the art. For example, the rack shelf could be constructed from various type of metals or plastics. However, in the preferred embodiment of the invention, the rack shelf is formed by injection molding. The preferred embodiment of the rack shelf 10 has the specific contours shown in FIGS. 1–6. Although numerous variations could be made to these contours, the preferred embodiment provides desirable structural rigidity, a pleasing aesthetic appearance and the benefit of reduced manufacturing costs because the rack shelf can be molded as a single piece from a simple two-piece mold. The material used to form the rack shelf 10 could be any material suitable for injection molding which would also be sufficiently rigid. For example, certain types of plastic or glass-filled nylon could be used. In the preferred embodiment of the invention, Vertron® long glass fiber reinforced nylon is used (RF-700-10 EM, LNP engineering plastics, 1831 E. Carnegie, Santa Ana, Calif.).

Figure 4:
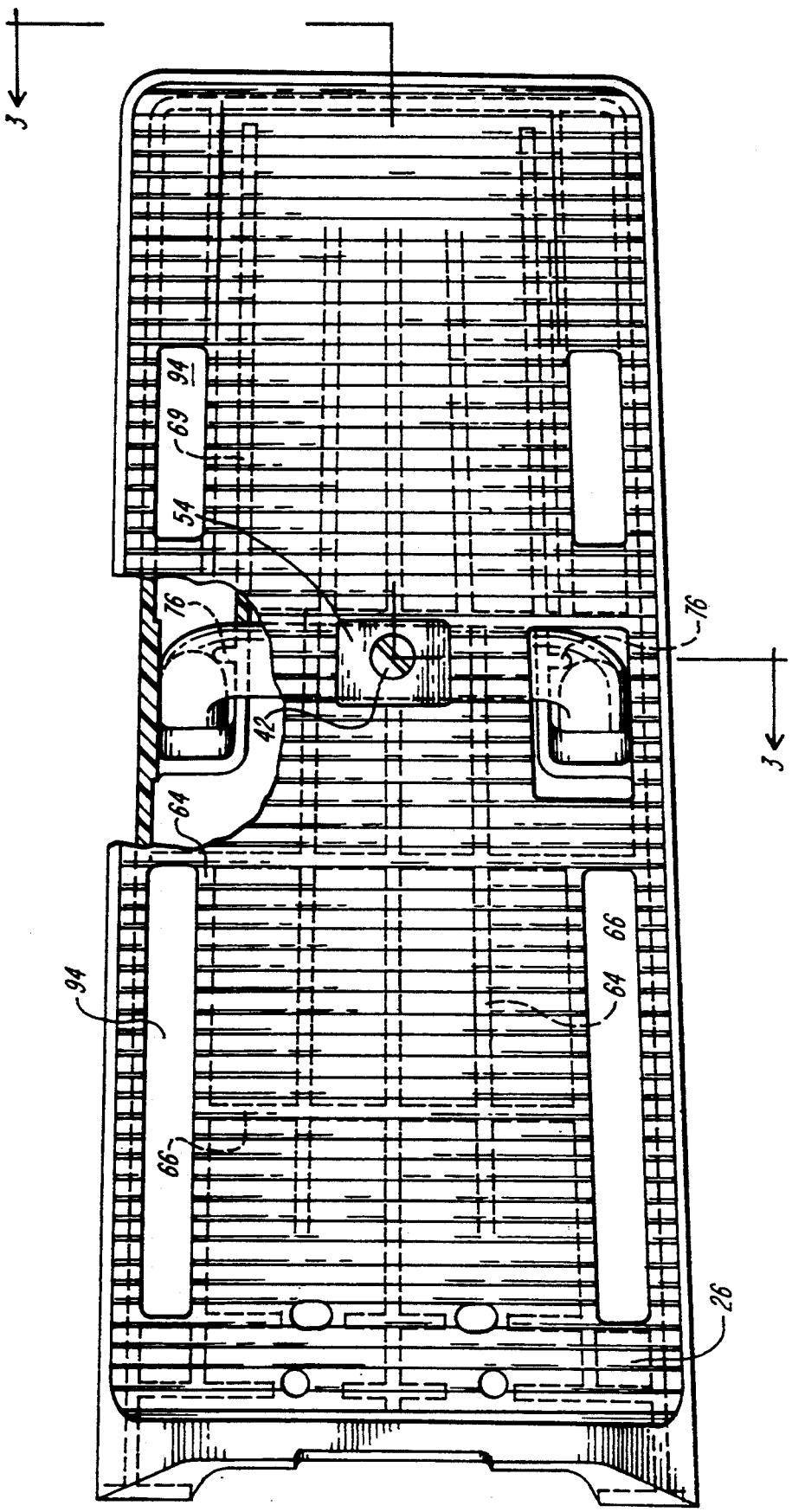
FIG. 4 is a top plan view of the molded rack shelf of FIG. 1 with support ribs shown in phantom.

At its forward end, the rack shelf 10 is attached to the frame of the bicycle through the use of two adjusting arms 14. The adjusting arms 14 connect to frame brackets 16 which can be fitted around the frame of the bicycle and clamped thereto. The frame brackets 16 are connected to the adjusting arms 14 via bracket bolts 18 and bracket nuts 20. Similarly, the adjusting arms 14 are connected to the rack shelf 10 via arm bolts 22 and adjustment self-locking arm nuts 24. The arm bolts 22 pass through holes 26 that are provided in the rack shelf 10; the holes 26 are shown in FIG. 4. Each adjusting arm 14 has an adjustment slot 28 through which the arm bolts 22 pass. The adjustment slots 28 allow the adjusting arms 14 to be adjusted relative to the rack shelf 10. The adjustability of the adjusting arms 14 enables the rack to be utilized with various types of bicycles; different bicycle types may have different distances between their rear wheels and frames.

The present invention can be attached to either the front or rear end of a bicycle. However, in the preferred embodiment, the rack is attached above the rear wheel of the bicycle. The attachment to the bike frame, accomplish via the adjusting arms 14 and frame brackets 16, provides structural support to the rack. For example, when a force is applied to the rear end of the rack shelf 10, the front end of the rack shelf would tend to rotate upward around an axis defined by the contact between the rack shelf 10 and the support member 12. The connection between the front end of the rack shelf and the bike frame assists in preventing the above-described rotation. Conversely, when a force is applied toward the front or center of the rack shelf 10, the force is primarily distributed down the support member 12 to the axle of the bicycle. This type of force does not cause the rack shelf to rotate relative to the support member because the support channels 30, described in greater detail below, engage the support legs 32 of the support member 12, thereby preventing rotation in this direction. The attachment between the front portion of the rack shelf 10 and the bike frame also provides some additional support for inhibiting this rotation.

In a preferred embodiment, a rack shelf handle 34 extends upwardly from the planar surface of the rack shelf at the forward end of the rack shelf. The rack shelf handle 34 forms an open slot and can be used for any number of functions. For example, it can provide a point of attachment for a bungy cord, rope or other similar item for the purpose of securing various articles to the rack shelf. Additionally, a person seated on the rack could utilize it for balancing purposes. Furthermore, this feature of the preferred embodiment is one of several that enables it to be utilized with the Child Seat and Carrier For Bicycle that is disclosed in co-pending application Ser. No. 07/415,174, filed Sep. 29, 1989 and entitled "Child's Bicycle Seat and Rack Assembly", the entire disclosure of which is incorporated herein by reference. Also at the rear end, the upper surface of the rack shelf 10 is provided with seat recess 36 for accommodating the above-referenced child seat. The recess 36 defines a rearwardly disposed recess edge 38 that is used as a stop to engage the back latch of the child seat in the manner described in the co-pending application.

The support member 12 is a U-shaped integral member having two support legs 32 depending downwardly from a center support beam 33. Each support leg 32 is provided at its free end with a leg hole 40 for attachment to the bicycle frame. It will be well understood by those skilled in the art that the support legs can be attached to the bicycle using any of a number of means known in the art.

The support member 12 can be made from any material that would provide sufficient strength to support the various types of accessories that are generally attached to bicycle racks. However, in the preferred embodiment, the legs are manufactured from tubular steel bent into the desired shape. This material provides sufficient support for the rack when used with the child seat described above, and also allows the legs to be inexpensively manufactured. If the support member was made from a material which did not provide as much strength as the steel legs of the preferred embodiment, the support channels 30 could be lengthened to contact the support legs 32 further down toward the axle of the bicycle in order to compensate for the reduced strength of the support member.

In the preferred embodiment, the connection between the support member 12 and the rack shelf 10 is accomplished by connection hardware at three points of intersection. A central point of connection attaches the support beam 33 to the center of the platform defined by the rack shelf 10, and two side points of connection attach the support legs 32 to the support channels 30. Before the rack shelf 10 and support member 12 can be lockably engaged, they must be positionally aligned relative to each other to allow for engagement. The alignment of the rack shelf with the support member for engagement purposes is more fully described below in connection with FIG. 6.

The central connection hardware utilized in the preferred embodiment includes a center machine screw 42 and a center self-locking nut 44. The center machine screw extends through center screw holes 46 and 48 that are respectively provided in the rack shelf 10 and support beam 33. The preferred embodiment also utilizes a curved washer 50 which fits between the center self-locking nut 44 and the center support beam 33. The curved washer 50 is shaped so that it lies flush with the center support beam 33, thereby providing three benefits. First, the curved washer provides a more aesthetically pleasing appearance than a flat washer. Second, the curved washer helps to cradle the center support beam 33 and thereby more evenly distribute the forces that are exerted at the intersection of the rack shelf 10 and the center support beam. The distribution of force provided by the curved washer has been found to reduce the pressure upon the center screw hole 46 of the rack shelf 10 thereby preventing the center machine screw 42 from cutting into the rack shelf. Third, the curved washer assists in preventing the rack shelf from rocking forward or backward relative to the center support beam when force is respectively exerted on either the front or back of the rack shelf.

In the preferred embodiment of the invention, the center interconnection means also includes a recess 52, provided within the top surface of the rack shelf 10, and a recess plate 54 which has a shape that substantially conforms to that of the recess 52 and which can therefore be fitted therein. The structures of the recess 52 and recess plate 54 are more particularly described below in relation to FIG. 5. However, at this point it may be noted that the combination of the recess 52 and recess plate 54 assists in the distribution of stress between the rack shelf and the support member. When the rack shelf and support member are locked into their engagement position, the recess plate 54 is tightened down into the recess 52 by the center machine screw 42 providing metal to metal engagement between the screw and plate, and fits snugly therein. The surface area contact between the recess plate 54 and recess 52 distributes the stresses that are generated when forces are exerted on either the front, back or sides of the rack shelf. The snug fit therebetween also prevents rocking of the rack shelf in a lateral direction relative to the support member and assists in preventing the rack shelf from rotating backward relative to the center support member.

The interconnection between the support member and the rack shelf is further strengthened by side interconnections between each support channel 30 and its corresponding support leg 32. The support channels 30 and support legs 32 are provided with aligned side holes 56 and 58 respectively for accommodating side screws 60. The side screws 60 are secured by side nuts 62 to secure the support channels 30 to the support legs 32.

The above-described interconnection allows the support member to be detachably locked to the rack shelf. Although the support member and the rack shelf are engaged in other areas, for example at the points where the front walls of the support channels contact the support legs, the three interconnection points described above are the only ones where the shelf and support member are locked to one another. The lockable engagement provides resistance against movement of the two members relative to each other in any direction. Additionally, the engagement can be unlocked to a disengaged state by the consumer/user of the rack. Thus, it will be readily understood that the rack may be assembled and disassembled simply and quickly, with an economy of parts, time and effort.

A number of other means for lockably engaging the support member and the rack shelf could be utilized. For example, the bottom of the rack shelf could be provided with a snap-fit structure that would allow the support member to be snap-locked into engagement with the rack shelf. Thus, the center support member could be snap-locked to the base of the rack and the support legs could be snap-locked to the leg channels. A snap-lock arrangement for the support legs and the leg channels is described below.

Figure 2:
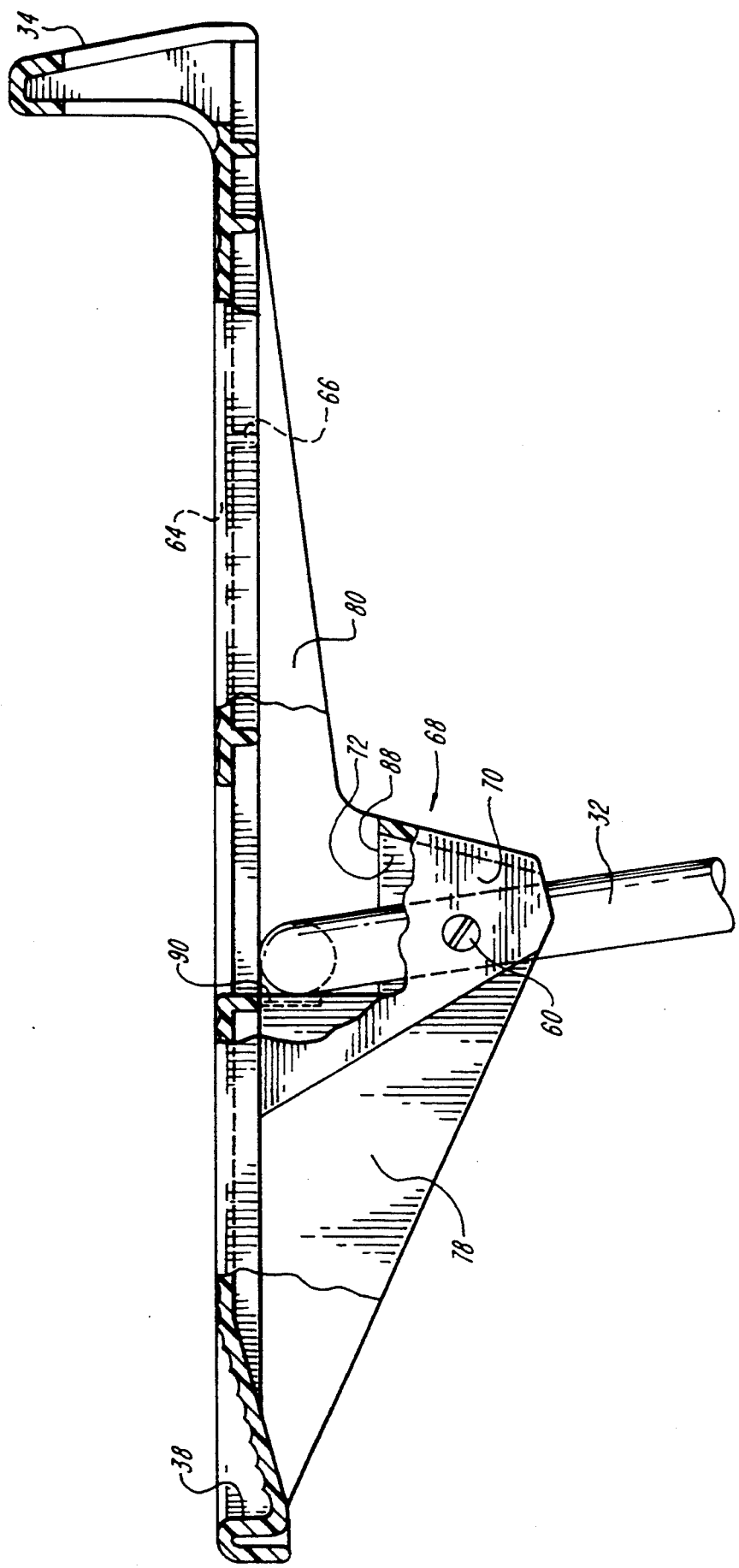
FIG. 2 is a side view of the assembled rack of FIG. 1, partially cut-away.
Figure 3:
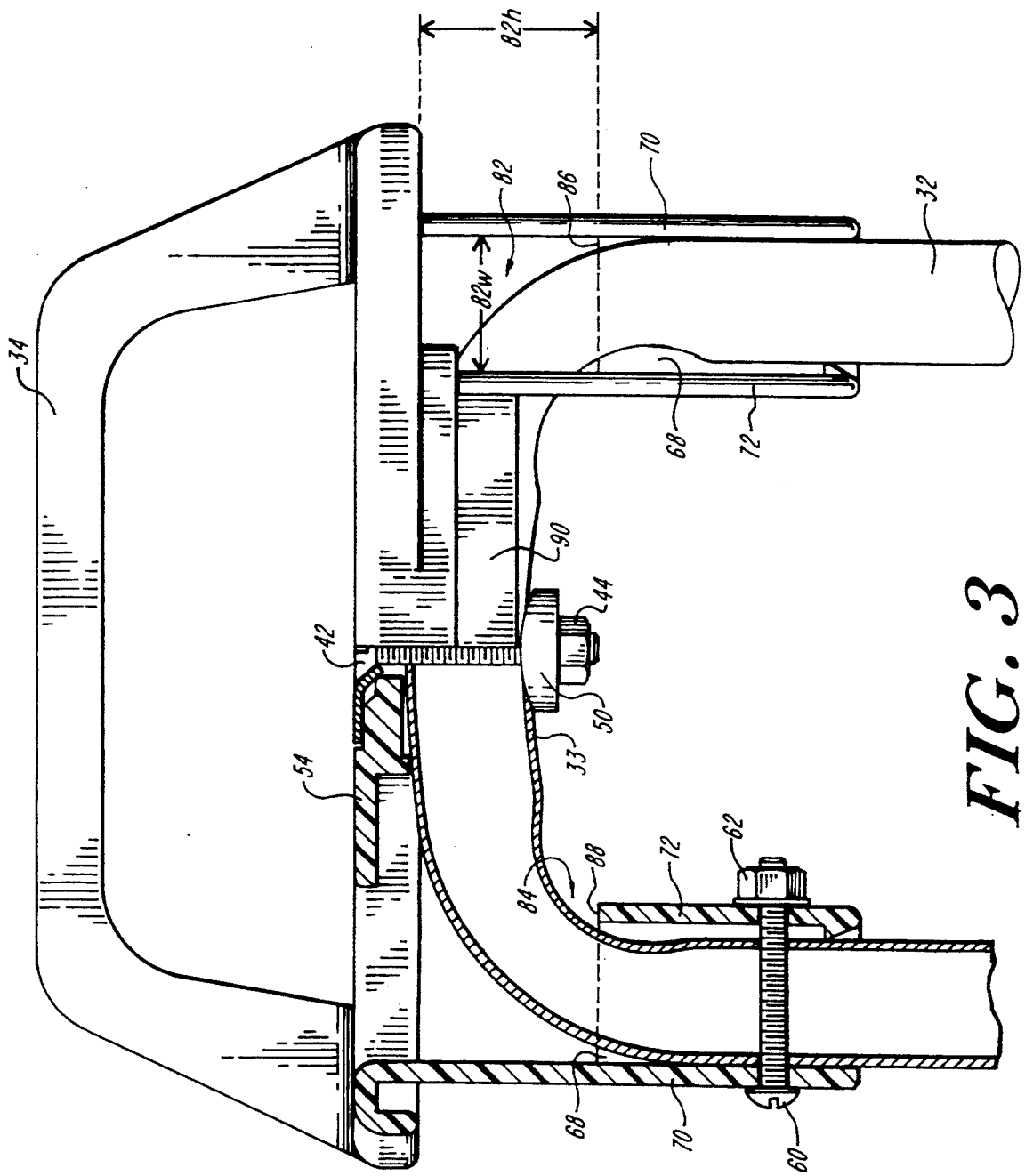
FIG. 3 is a cross-sectional end view of the molded rack shelf taken along line 3—3 of FIG. 2.

FIGS. 2-4 depict further the rack shelf of the preferred embodiment. FIG. 2 is a side view of the rack shelf, partially cut-away and with various features shown in phantom. The rack shelf is provided with length support ribs 64 extending along the length of the bottom surface of the rack shelf and width support ribs 66 extending across the width of the bottom surface of the rack shelf; these support ribs are shown in phantom in both FIG. 2 and in FIG. 4. Many other patterns of length and width support ribs could be utilized which would also provide adequate support for the rack shelf. However, the precise pattern of support ribs utilized in the preferred embodiment has been shown to provide sufficient support and also result in an overall rack shelf contour that can be manufactured as a simple piece from a simple two-piece injection mold.

The support channels 30 extend downwardly from the platform defined by the rack shelf. Each support channel has a front wall 68, an outer side wall 70 and an inner side wall 72. Each front wall 68 tapers slightly toward the rear of the rack, from the outer side walls 70 to the inner side walls 72.

Rather than utilizing two distinct support channels 30, a single support wall could be provided. The single support wall could extend across the width of the rack shelf 10 and provide contact points with each support leg 32 to prevent the above-described rotation of the rack shelf relative to the support member. However, separate support channels are preferred. The support channels 30 provide support in two ways. First, the lower portion of the front walls 68 contact the support legs 32. This point of contact prevents rotation of the rack shelf relative to the center support beam when force is applied to the front portion of the rack shelf. Second, the support channels 30 are provided with snap-fit recesses 74 (FIG. 3). The snap-fit recesses 74 are rounded and conform to the shape of the support legs 32. The snap-fit recesses 74 are at least partially defined by the inner side walls 72 of the support channels 30. The rearward portion 76 of the inner side walls 72 protrude across the support channel 30, thereby creating an opening for entry into the snap-fit recess 74 that is slightly narrower than the width of the support legs 32. Consequently, force is necessary to snap-fit the support legs into the snap-fit recess. Similarly, once the support leg is snapped into the snap-fit recess, force is required to remove it therefrom. These snap-fit recesses are helpful in aligning the center support beam with the rack shelf prior to the insertion of the machine screw 42 because they hold the relative position of these two members substantially constant as long as no force is applied to either member. Additionally, the snap-fit recesses 74 also provide some resistance to rotation of the rack shelf relative to the support member when force is applied to the rear end of the rack shelf. A force in this direction would tend to cause the support legs to be rotated out of the support channels, but the snap-fit engagement provides some resistance to this rotation. However, the snap-fit engagement does allow the two members to be disengaged by the application of a small amount of force directed toward pushing the support legs out of the support channels.

Although the preferred embodiment utilizes the support channels along with their associated snap-fit recesses, the invention in its broadest sense is not so limited. The other means of engagement between the rack shelf and support member would suffice to support these two members for some uses of the rack. However, when the rack is utilized along with the Child Seat and Carrier For Bicycle that is disclosed in co-pending application Ser. No. 07/415,174, the support channels have been found to provide desirable support.

The support channels are integrally formed with inner support flanges 78 and outer support flanges 80 that each extend along the length of the bottom surface of the rack shelf. The outer side walls 70 are formed as a part of outer support flanges 80 and the inner side walls 72 are formed as a part of the inner support flanges 78. In the preferred embodiment, the inner support flanges 78 extend toward the rear end of the rack shelf and the outer support flanges extend toward the front end of the rack shelf. Other arrangements are of course possible. For example, the inner support flanges 78 could extend forward to the front portion of the rack shelf. If the inner support flanges 78 extended forwardly rather than rearwardly, the assembly of the composite rack could be accomplished in a different manner. This alternate manner of assembly is more fully described below. The presence of these support flanges is principally to provide support for both the support channels and the rack shelf overall.

The inner support flanges 78 of the preferred embodiment extend rearwardly from the support channels and are disposed inwardly of the side edges of the rack shelf. This is to allow the rack to be utilized with various accessories that slidably engage the outer edges of the rack shelf. As previously stated, the preferred embodiment of the present invention is designed to be utilized along with the Child Seat and Carrier For Bicycle described in co-pending application No. 07/415,174. Consequently, for the reasons stated in that co-pending application, the outer edges of the rack shelf along its rear portions are free of any members extending downward therefrom.

Each support channel 30 has a front channel opening 82 that extends between the bottom surface of the rack shelf and the top surface 86 of the front walls 68. When the preferred embodiment of the rack is assembled, the support legs 32 pass through this opening. Consequently, the front channel opening 82 has a height and a width that are larger than the diameter of the support legs 32; the front channel opening height 82h and width 82w are shown in FIG. 3. As described more fully below, the rack could alternatively be designed to be assembled in ways that do not require the support legs 32 to be inserted through the front channel opening 82. If such a design were utilized, the front channel opening 82 would not be required.

Each support channel also has a side channel opening 84 that extends between the bottom surface of the rack shelf and the top surface 90 of the inner side wall 72. This provides clearance for the proper positioning of the center support beam 33 (FIGS. 2 and 3).

The bottom surface of the rack shelf 10 is provided with a support wall 90 extending downward from its planar portion; the support wall 90 is shown in phantom in FIG. 2. The support wall 90 extends partially across the width of the rack shelf 10 and serves two main purposes. First, it assists in aligning the center support beam relative to the rack shelf prior to the insertion of the machine screw. Second, the support wall 90 also provides overall structural support to the rack and resistance against rotation of the rack shelf relative to the support member.

FIG. 3 shows a partial cross-sectional view taken along line 3—3 of FIG. 2. The rack shelf handle 34 has various recesses (not shown) within its structure. These recesses enable the rack shelf to be manufactured from less material and thereby have less weight.

The support wall 90 extends partially across the width of the rack shelf, between the inner side walls 72. Alternatively, the inner support wall 90 could be constructed to be of narrower width so that it would not extend completely from one inner side wall to the other. The width of the support wall should be sufficient to enable the support wall to provide the alignment and support features.

FIG. 4 shows a top view of the rack shelf. The top surface has a series of ridges 92 extending along the width of the rack shelf. These ridges 92 provide some friction to the top surface of the rack shelf which is helpful in preventing any articles attached to the rack shelf from sliding relative thereto. The top surface of the rack shelf is also provided with shelf openings 94 along each side. These shelf openings 94 can be utilized to attach panniers to the sides of the rack shelf. Additionally, they can be utilized for attaching bungy cords, ropes or similar items across the width of the rack shelf for the purpose of securing items placed thereon. Holes 26 are provided at the front portion of the rack shelf for attachment to the adjusting arms 14 as previously described.

FIG. 4 also illustrates the snap-fit recesses 74 that are provided within the support channels 30. The snap-fit recesses 74 are rounded and conform to the shape of the support legs 32. The snap-fit recesses 74 are at least partially defined by the inner side walls 72 of the support channels 30. The rearward portion 76 of the inner side walls protrude across the support channel 30, thereby creating an opening for entry into the snap-fit recess, which opening is slightly narrower than the width of the support legs 32.

The assembly of the preferred embodiment is accomplished by sliding the support legs 32 through the front channel openings as is more fully described below in connection with FIG. 6. Consequently, the front channel openings are provided with dimensions sufficient to accommodate the support legs. Alternate designs are contemplated in which assembly could be accomplished without requiring the support legs to slide through openings. In those designs, side openings would not be required and, for example, the support wall 90 could extend completely across the width of the rack shelf.

Figure 5:
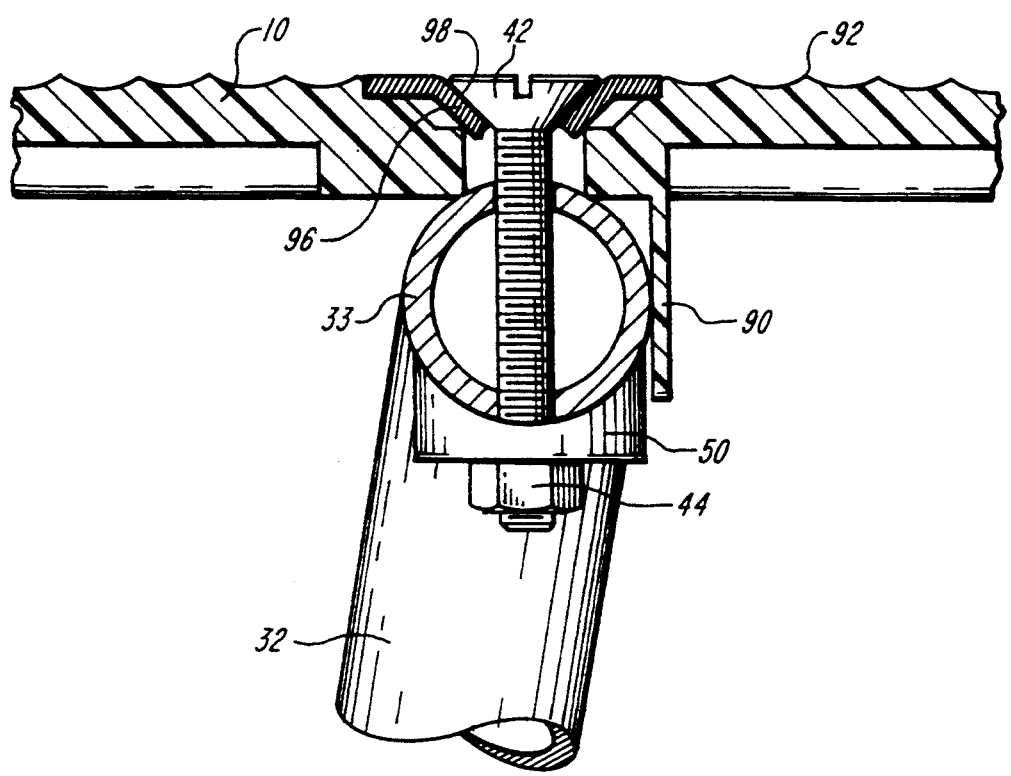
FIG. 5 is a partial cross-sectional view of the central attachment between the shelf and support member.

FIG. 5 is a cross-sectional side view of the interconnection between the rack shelf 10 and the center support beam 33. Recess plate 54 has a substantially rectangular base and a rounded protrusion 96 extending downward therefrom. Passing through the rectangular base and rounded protrusion is an opening for passing the machine screw 42 therethrough. The rectangular plate further has a screw recess 98 which conforms in shape to the contour of the bottom surface of the head of the machine screw 42. The machine screw 42 fits within the screw recess such that the top surface of the head of the machine screw lies flush with the top surface of the rectangular base.

The top surface of the rack shelf 10 is provided with a recess 52 which is constructed to accommodate the recess plate 54. Because the contour of the recess 52 matches that of the recess plate 54, the recess plate 54 fits snugly within the recess 52. Therefore, the top surface of the recess plate 54 lies flush with the top surface of the rack shelf 10. The surface area contact between the recess plate and the recess assists in dispersing the force that is exerted on the connection between the rack shelf and the center support beam. Furthermore, this surface area contact between the recess and the recess plate assists in preventing any movement of the rack shelf relative to the support member in either a lateral or forward/backward direction.

Several features are helpful in aligning the support member with the rack shelf to facilitate the insertion of the machine screw 42. The length support ribs located toward the middle of the rack have a distance therebetween that is approximately equal to the width of the recess 52. Each of these two length support ribs has a beam-receiving recess which is shaped to conform to the outer surface of the center support beam when the support member is properly aligned with the rack shelf for engagement with the machine screw.

Figure 6:
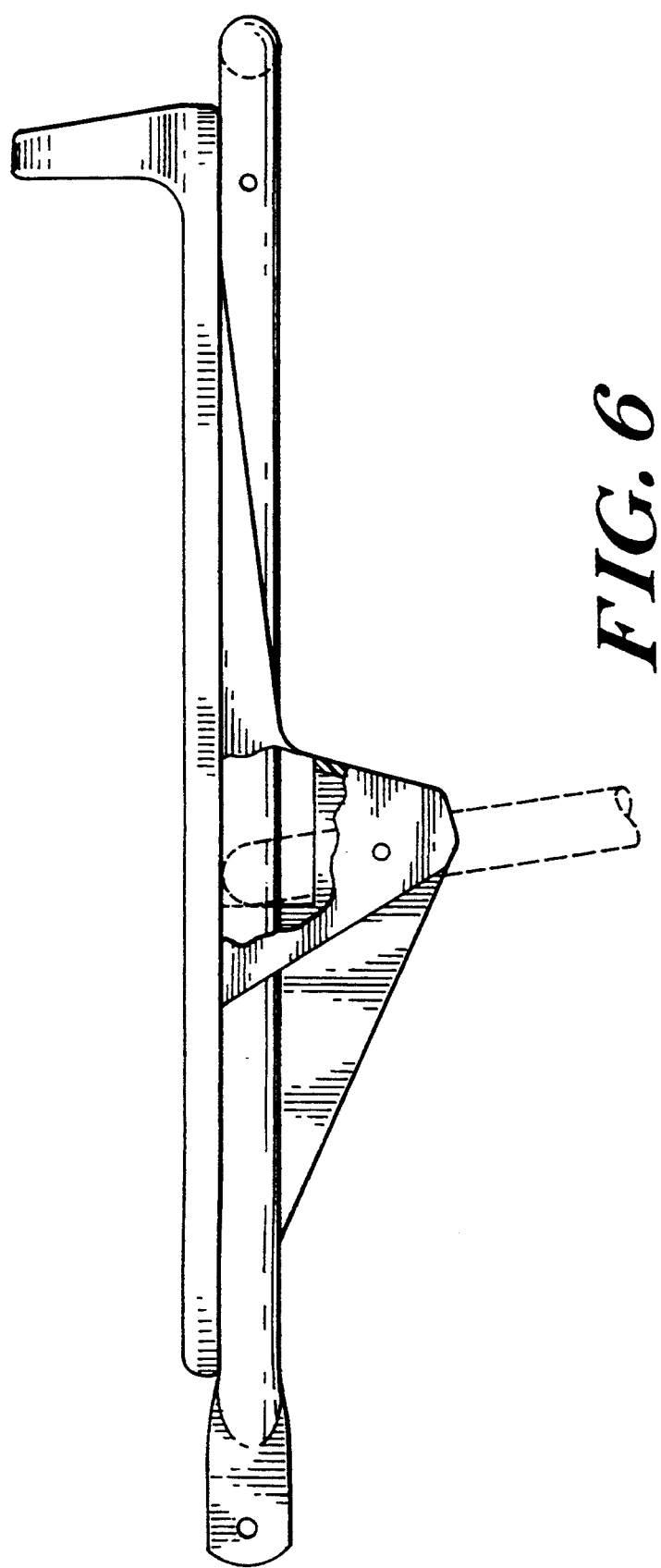
FIG. 6 is a perspective view of the support member being positioned relative to the molded rack shelf in a storage position.

FIG. 6 is a perspective view of the support member being positioned relative to the molded rack shelf in a storage position.

The manner in which the preferred embodiment is assembled now will be described. The support member 12 is placed adjacent and parallel to the bottom of the rack shelf 10 with the support legs 32 pointing toward the rear edge of the rack shelf. The ends 100 of the support legs 32 are positioned at the side of the front wall openings located toward the front end of the rack shelf. The support legs 32 thus are aligned with the rack shelf so that they will pass through the front wall openings. Thereafter, the support member 12 is slid toward the rear of the rack until the center support beam contacts the support wall 90. Thereafter, the ends 100 of the support legs 32 are rotated downwardly away from the rack shelf and then toward the front edge of the rack shelf. The support wall 90 contacts the center support beam and prevents it from sliding toward the rear of the rack shelf. The support legs 32 must then be provided with a slight force in a direction toward the front of the rack shelf, to cause them to snap-fit within the snap-fit recesses of the support channels. The snap-fit recesses serve to align the center support beam, along with additional alignment assistance from the support wall and the beam receiving recesses, so that the center screw hole of the center support beam is aligned with the center screw hole of the rack shelf. Thereafter, the machine screw can be inserted through the recess plate, the screw hole in the rack shelf, the screw hole in the center support beam, and the curved washer before being secured by the center-locking nut.

The rack could be designed differently to enable various other methods of assembly to be utilized. For example, if the inner support flanges were constructed to extend toward the front of the rack shelf, rather than toward the rear, the support member could be aligned with the rack shelf without requiring that the legs slide through openings. With such a design, channel openings would not be required and the walls of the support channel could extend all the way to the bottom surface of the rack shelf. A rack having this design could be assembled using the following steps: (1) the rack shelf would be placed upside down, (2) the support member would be lowered downwardly, center beam leading, onto the bottom surface of the rack shelf, (3) the center support beam would be fitted between the support wall and the front wall of the support channels, (4) the support legs could be snapped into the support channels and (5) the connection hardware could then be utilized to connect the support member to the rack shelf.

Another alternate design could be used wherein the rack shelf is a two-piece design. A first piece would correspond essentially with the rack shelf, but without inner side walls 72. A second piece would attach to the bottom of the rack shelf to complete the leg channels and to capture the support member. To assemble the device, the support member would be positioned on the bottom surface of the rack with the legs extending in their use position, and the second piece then would be positioned to sandwich the center beam of the U-shaped support member between the second piece and first piece, thereby securing the support member to the rack shelf. In either of the two alternate designs described above, it would be unnecessary to slide the legs of the support member through openings for assembly purposes.

In all of the foregoing designs, the rack shelf is formed entirely of plastic, fast assembly and disassembly is permitted, and the rack is capable of being positioned in a substantially planar storage and/or shipment mode and a non-planar use position.

It should be understood that various changes and modifications of the embodiment shown in the drawings may be made within the scope of this invention. Thus, it is intended that all matter contained in the above description and shown in the accompanying drawings shall be interpreted in an illustrative and not limiting sense.

What I claim is:

1. A bicycle rack for attachment to a bicycle having a bicycle frame, the rack adapted to be supported substantially above a wheel of the bicycle in a use position, comprising:
   a rack shelf defining a platform and having at least one leg channel extending downwardly from the platform, said leg channel being defined by a side wall extending along a length of the platform and a front wall extending from said side wall at least partially across a width of the platform; and
   a substantially U-shaped support member detachably locked to the rack shelf, the support member having two support legs connected by a center beam, whereby the center beam engages a bottom surface of the platform and the support legs engage at least one of said walls defining the leg channel.

2. A bicycle rack as claimed in claim 1 wherein the leg channel is constructed and arranged to prevent downward rotation of a front end of the rack shelf relative to the center beam.

3. A bicycle rack as claimed in claim 1 wherein said at least one leg channel includes a pair of leg channels positioned on opposite sides of said rack shelf such that each support leg engages the front wall of a respective leg channel, the rack shelf including securing means for securing the support legs within the leg channels.

4. A bicycle rack as claimed in claim 3 wherein said securing means includes means for snap-fit engaging the support legs to the leg channels.

5. A bicycle rack as claimed in claim 1 having an opening between the front wall of said leg channel and a bottom surface of the rack shelf platform, said opening having a height that is greater than a thickness of the support legs.

6. A bicycle rack as claimed in claim 1 wherein the bottom surface of the rack shelf includes a planar surface and a back wall extending downward therefrom, said back wall for engagement with said center beam of the support member in the use position.

7. A bicycle rack as claimed in claim 6 wherein the rack shelf has sides extending along a length thereof, said rack shelf having an opening between the back wall and each side of the rack shelf, each opening having a width that is greater than a width of a support leg.

8. A bicycle rack as claimed in claim 1 including means for detachably locking the support member to the rack shelf, said means for detachably locking including center locking means for detachably locking the center support beam to the rack shelf.

9. A bicycle rack as claimed in claim 8 wherein the center locking means includes means for defining a hole through the center support beam, means for defining a hole through the rack shelf, a bolt and a nut, said bolt passing through the holes and being secured by the nut.

10. A bicycle rack as claimed in claim 9 wherein said means for detachably locking further includes:
    means for defining a recess in a surface of the rack shelf and a recess plate for fitting within said recess, said hole through the rack shelf being constructed and arranged to pass through said recess, said recess plate having means for defining a recess plate hole therethrough;
    said bolt passing through the recess plate hole and securing the recess plate within the recess.

11. A bicycle rack as claimed in claim 1 wherein the leg channel side wall is integrally connected to at least one support flange extending along a length of the rack shelf.

12. A bicycle rack as claimed in claim 11 wherein the rack shelf has sides extending along its length, and wherein at least one support flange extends along a side of the rack shelf and terminates substantially forward of the rear end of the rack shelf.

13. A bicycle rack as claimed in claim 11 wherein:
    the rack shelf has sides extending along its length; and
    the at least one support flange includes a pair of rear support flanges extending rearwardly from the at least one log channel, the rear support flanges being arranged so that they do not extend along the sides of the rack shelf.

14. A bicycle rack as claimed in claim 1 wherein said at least one leg channel includes a pair of leg channels positioned on opposite sides of said rack shelf such that each support leg engages the front wall of a respective leg channel, the rack shelf including securing means for securing the support legs within the leg channels; and wherein the bottom surface of the rack shelf includes a planar surface and a support wall extending downward therefrom, said support wall for engagement with said center beam of the support member in the use position.

15. A bicycle rack as claimed in claim 1 wherein the rack shelf further includes a pair of leg channels, the leg channels including securing means for securing the support legs within the leg channels; and the bicycle rack includes center locking means for detachably locking the center support beam to the rack shelf, the center locking means includes means for defining a hole through the center support beam, means for defining a hole through the rack shelf, a bolt, a nut, means for defining a recess in a surface of the rack shelf and a recess plate for fitting within said recess, said hole through the rack shelf being constructed and arranged to pass through said recess, said recess plate having means for defining a hole therethrough; said bolt passing through the holes and securing the recess plate within the recess.

16. A bicycle rack as claimed in claim 1 wherein the rack shelf has sides extending along its length, said at least one channel including a pair of leg channels positioned on opposite sides of said rack shelf such that each support leg engages the front wall of a respective leg channel, the rack shelf including securing means for securing the support legs within the leg channels; and wherein each leg channel side wall is integrally connected to at least one support flange, said support flange extending along a side of the rack shelf and terminating substantially forward of the rear end of the rack shelf.

17. A bicycle rack as claimed in claim 1 wherein the bottom surface of the rack shelf includes a planar surface and a back wall extending downward therefrom, said back wall for engagement with said center beam of the support member in the use position;

the bicycle rack further including center locking means for detachably locking the center support beam to the rack shelf, the center locking means includes means for defining a hole through the center support beam, means for defining a hole through the rack shelf, a bolt, a nut, means for defining a recess in a surface of the rack shelf and a recess plate for fitting within said recess, said hole through the rack shelf being constructed and arranged to pass through said recess, said recess plate having means for defining a hole therethrough; said bolt passing through the holes and securing the recess plate within the recess.

18. A bicycle rack as claimed in claim 1 wherein the bottom surface of the rack shelf includes a planar surface and a back wall extending downward therefrom, said back wall for engagement with said center beam of the support member in the use position; and the leg channel side wall is integrally connected to at least one support flange, said support flange extending along a side of the rack shelf and terminating substantially forward of the rear end of the rack shelf.

19. A bicycle rack as claimed in claim 1 wherein the leg channel is integrally connected to at least one support flange, said support flange extending along a side of the rack shelf and terminating substantially forward of the rear end of the rack shelf; and the bicycle rack further includes center locking means for detachably locking the center support beam to the rack shelf, the center locking means includes means for defining a hole through the center support beam, means for defining a hole through the rack shelf, a bolt, a nut, means for defining a recess in a surface of the rack shelf and a recess plate for fitting within said recess, said hole through the rack shelf being constructed and arranged to pass through said recess, said recess plate having means for defining a hole therethrough; said bolt passing through the holes and securing the recess plate within the recess.

20. A bicycle rack as claimed in claim 1 wherein the at least one of said walls that engages the support legs is the front wall.

21. A bicycle rack as claimed in claim 1 wherein said substantially U-shaped support member is substantially planar.

22. A bicycle rack for attachment to a bicycle having a bicycle frame, the rack adapted to be supported substantially above a wheel of the bicycle in a use position, comprising:

a rack shelf defining a platform having a width, the rack shelf including a front wall extending at least partially across the width of the platform, the rack shelf further including a front wall opening between the front wall and the platform; and a substantially U-shaped support member detachably locked to the rack shelf, the support member having two support legs connected by a center beam, whereby the center beam engages a bottom surface of the platform and the support legs engage the front wall, the support legs having a thickness that is less than a height of said front wall opening.

23. A bicycle rack as claimed in claim 22 wherein the shelf includes a pair of side walls extending along a length of the platform, the side walls being integrally connected to the front wall.

24. A bicycle rack as claimed in claim 23 wherein the shelf includes side wall openings between the platform and the side walls, said side wall openings having a height that is greater than a thickness of the center beam of the support member.

25. A bicycle rack as claimed in claim 24 wherein the side walls are positioned between the support legs in the use position.

26. A bicycle rack as claimed in claim 24 wherein the rack shelf further includes a pair of outer walls extending along the length of the platform, said outer walls being integrally connected to the front wall, said outer walls being positioned on opposing sides of the support legs in the use position.

27. A bicycle rack as claimed in claim 26 wherein each support leg further engages a respective outer wall.

28. A bicycle rack as claimed in claim 23 wherein each support leg further engages a respective side wall.

29. A bicycle rack as claimed in claim 22 wherein said substantially U-shaped support member is substantially planar.

30. A bicycle rack as claimed in claim 1 wherein said at least one leg channel includes a pair of leg channels positioned on opposite sides of said rack shelf such that each support leg engages the front wall of a respective leg channel.

31. A bicycle rack as claimed in claim 1 wherein:
the rack shelf includes a surface having a recess, and a hole passing through the recess;
the center support beam has a hole passing therethrough; and
the bicycle rack includes a locking assembly for detachably locking the support beam to the rack shelf, the center locking assembly including a bolt and a nut, said bolt passing through the holes and securing the rack shelf to the center support beam.

32. A bicycle rack as claimed in claim 31 wherein the recess is constructed and arranged so that the bolt does not extend substantially above the surface of the rack shelf.

33. A bicycle rack as claimed in claim 31 wherein said at least one leg channel includes a pair of leg channels positioned on opposite sides of said rack shelf such that each support leg engages the front wall of a respective leg channel.

34. A bicycle rack as claimed in claim 1 wherein the at least one leg channel includes a pair of leg channels; and
the bottom surface of the rack shelf includes a planar surface and a back wall extending downwardly therefrom, said back wall for engagement with said center beam of the support member in the use position.

35. A bicycle rack as claimed in claim 1 wherein:
the rack shelf has sides extending along its length;
said at least one leg channel includes a pair of leg channels; and
the pair of leg channels are respectively integrally connected to a pair of rear support flanges extending rearwardly therefrom, the rear support flanges being arranged so that they do not extend along the sides of the rack shelf.

36. A bicycle rack as claimed in claim 1 wherein said at least one leg channel includes a pair of leg channels positioned on opposite sides of said rack shelf such that each support leg engages the front wall of a respective leg channel; and
wherein the bottom surface of the rack shelf includes a planar surface and a support wall extending downward therefrom, said support wall for engagement with said center beam of the support member in the use position.

37. A bicycle rack as claimed in claim 1 wherein the rack shelf has sides extending along a length thereof, and wherein;
the rack shelf includes an opening between the front wall of said leg channel and a bottom surface of the rack shelf platform, said opening having a height that is greater than a thickness of the support legs;
the bottom surface of the rack shelf includes a planar surface and a support wall extending downward therefrom, said support wall for engagement with said center beam of the support member in the use position; and
said rack shelf having openings between the support wall and the sides of the rack shelf, each opening having a width that is greater than a width of a support leg.

38. A bicycle rack for attachment to a bicycle having a bicycle frame, the rack adapted to be supported substantially above a wheel of the bicycle in a use position, comprising:
a rack shelf defining a platform having a length and a width, the rack shelf including at least one front wall that extends at least partially across the width of the platform; and
a substantially U-shaped support member detachably locked to the rack shelf, the support member having two support legs connected by a center beam, whereby the center beam engages a bottom surface of the platform and the support legs engage the at least one front wall.

39. A bicycle rack as claimed in claim 38 wherein the rack shelf further includes a pair of outer walls extending at least partially along the length of the platform, said outer walls being integrally connected to the front wall, said outer walls being positioned on opposing sides of the support legs in the use position.

40. A bicycle rack as claimed in claim 39 wherein each support leg further engages a respective outer wall.

41. A bicycle rack as claimed in claim 38 wherein said substantially U-shaped support member is substantially planar.

42. A bicycle rack as claimed in claim 38 wherein the bottom surface of the rack shelf includes a planar surface and a back wall extending downward therefrom, said back wall for engagement with said center beam of the support member in the use position.

43. A bicycle rack as claimed in claim 38 wherein the rack shelf includes a pair of support flanges that are integrally connected with the at least one front wall, the pair of support flanges extending at least partially along the length of the platform.

44. A bicycle rack as claimed in claim 38 wherein the rack shelf includes a pair of forward support flanges that are integrally connected with at least one front wall, the pair of forward support flanges extending forwardly from the at least one front wall at least partially along the length of the platform.

45. A bicycle rack as claimed in claim 38 wherein:
the bottom surface of the rack shelf includes a planar surface and a back wall extending downward therefrom, said back wall for engagement with said center beam of the support member in the use position; and
the rack shelf includes a pair of rear support flanges that are integrally connected with the back wall, the pair of rear support flanges extending rearwardly from the back wall at least partially along the length of the platform.

46. A bicycle rack as claimed in claim 45 wherein the rack shelf has sides extending along its length, and the rear support flanges are displaced from side of the rack shelf.

47. A bicycle rack as claimed in claim 38 wherein:
the rack shelf further includes a surface having a recess, and a hole passing through the recess;
the center support beam includes a hole passing therethrough; and
the bicycle rack includes a locking assembly for detachably locking the center support beam to the rack shelf, the locking assembly including a bolt and a nut, said bolt passing through the holes and securing the rack shelf to the center support beam.

48. A bicycle rack as claimed in claim 47, wherein the recess is constructed and arranged so that the bolt does not extends substantially above the surface of the rack shelf.

49. A bicycle rack as claimed in claim 38, wherein the rack shelf platform has a forward end, the rack shelf including a handle extending upwardly from the platform at the forward end, the handle being constructed and arranged to form a slot that extends substantially across the width of the platform at the forward end.

50. A bicycle rack as claimed in claim 38 wherein:
the rack shelf has sides extending along its length;
said substantially U-shaped support member is substantially planar;
the bottom surface of the rack shelf includes a planar surface and a back wall extending downward therefrom, said back wall for engagement with said center beam of the support member in the use position;
the rack shelf includes a pair of forward support flanges that are integrally connected with the at least one front wall, the pair of forward support flanges extending forwardly from the at least one front wall at least partially along the length of the platform;
the rack shelf includes a pair of rear support flanges that are integrally connected with the back wall, the pair of rear support flanges extending rearwardly from the back wall at least partially along the length of the platform, the rear support flanges being displaced from the sides of the rack shelf;
the rack shelf includes a surface having a recess, and a hole passing through the recess;
the center support beam includes a hole passing therethrough; and
the bicycle rack includes a locking assembly for detachably locking the center support beam to the rack shelf, the locking assembly including a bolt and a nut, said bolt passing through the holes and securing the rack shelf to the center support beam.

51. A bicycle rack as claimed in claim 38 wherein:
said substantially U-shaped support member is substantially planar;
the bottom surface of the rack shelf includes a planar surface and a back wall extending downward therefrom, said back wall for engagement with said center beam of the support member in the use position.

52. A bicycle rack as claimed in claim 38 wherein:
said substantially U-shaped support member is substantially planar; and
the rack shelf includes a pair of support flanges that are integrally connected with the at least one front wall, the pair of support flanges extending at least partially along the length of the platform.

53. A bicycle rack as claimed in claim 38 wherein:
the bottom surface of the rack shelf includes a planar surface and a back wall extending downward therefrom, said back wall for engagement with said center beam of the support member in the use position; and
the rack shelf includes a pair of support flanges that are integrally connected with the at least one front wall, the pair of support flanges extending at least partially along the length of the platform.

54. A bicycle rack as claimed in claim 53 wherein said substantially U-shaped support member is substantially planar.

55. A bicycle rack as claimed in claim 38 wherein:
the rack shelf has sides extending along its length;
the rack shelf includes a pair of forward support flanges that are integrally connected with the at least one front wall, the pair of forward support flanges extending forwardly from the at least one front wall at least partially along the length of the platform;
the bottom surface of the rack shelf includes a planar surface and a back wall extending downwardly therefrom, said back wall for engagement with said center beam of the support member in the use position; and
the rack shelf includes a pair of rear support flanges that are integrally connected with the back wall, the pair of rear support flanges extending rearwardly from the back wall at least partially along the length of the platform, the rear support flanges being displaced from the sides of the rack shelf.

56. A bicycle rack as claimed in claim 55 wherein said substantially U-shaped support member is substantially planar.

57. A bicycle rack as claimed in claim 38 wherein:
said substantially U-shaped support member is substantially planar;
the rack shelf further includes a surface having a recess, and a hole passing through the recess;
the center support beam includes a hole passing therethrough; and
the bicycle rack includes a locking assembly for detachably locking the center support beam to the rack shelf, the locking assembly including a bolt and a nut, said bolt passing through the holes and securing the rack shelf to the center support beam.

58. A bicycle rack as claimed in claim 38 wherein:
the bottom surface of the rack shelf includes a planar surface and a back wall extending downward therefrom, said back wall for engagement with said center beam of the support member in the use position;
the rack shelf includes a surface having a recess, and a hole passing through the recess;
the center support beam includes a hole passing therethrough; and
the bicycle rack includes a locking assembly for detachably locking the center support beam to the rack shelf, the locking assembly including a bolt and a nut, said bolt passing through the holes and securing the rack shelf to the center support beam.

* * * * *

UNITED STATES PATENT AND TRADEMARK OFFICE
CERTIFICATE OF CORRECTION

PATENT NO. : 5,341,971

DATED : August 30, 1994

INVENTOR(S) : Dixon Newbold and Ian Gilley

It is certified that error appears in the above-identified patent and that said Letters Patent is hereby corrected as shown below:

Column 10:

Claim 13, line 5, delete the word "log" and replace it with the word --leg--.

Column 12:
Claim 24, line 2, before the word "shelf" add the word --rack--.

Column 14:
Claim 46, line 3, delete the word "side" and replace it with

Column 15:
the word --sides--.

Claim 48, line 3, delete the word "extends" and replace it with the word --extend--.

Claim 51, line 3, after the word "planar", add the word --and--.

Column 16:
Claim 55, line 10, delete the word "downwardly" and replace it with the word --downward--.

Signed and Sealed this

Seventh Day of March, 1995

Attest:

BRUCE LEHMAN

Attesting Officer

Commissioner of Patents and Trademarks